United States Patent
Smith et al.

(10) Patent No.: US 9,660,836 B2
(45) Date of Patent: May 23, 2017

(54) NETWORK TOPOLOGY DISCOVERY

(71) Applicant: Lattice Semiconductor Corporation, Portland, OR (US)

(72) Inventors: Taliaferro Smith, San Jose, CA (US); Sergey Yarygin, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/693,802

(22) Filed: Apr. 22, 2015

(65) Prior Publication Data

US 2015/0326444 A1 Nov. 12, 2015

Related U.S. Application Data

(60) Provisional application No. 61/989,411, filed on May 6, 2014.

(51) Int. Cl.
*H04L 12/24* (2006.01)
*H04L 12/751* (2013.01)
*H04L 12/64* (2006.01)

(52) U.S. Cl.
CPC .......... *H04L 12/6418* (2013.01); *H04L 41/12* (2013.01); *H04L 45/02* (2013.01)

(58) Field of Classification Search
CPC ... H04L 12/24; H04L 12/751; H04L 12/6418; H04L 29/04; H04L 29/08; H04L 41/12; H04L 45/02; H04L 45/26; H04L 1/00; H04L 12/26; H04L 12/28; H04L 12/46; H04L 12/56; H04L 12/721; H04J 3/22; H04W 40/02; G06F 15/173
See application file for complete search history.

(56) References Cited

U.S. PATENT DOCUMENTS

| | | | | |
|---|---|---|---|---|
| 6,047,330 A | * | 4/2000 | Stracke, Jr. | H04L 41/12 370/409 |
| 6,304,556 B1 | * | 10/2001 | Haas | H04L 45/02 370/238 |
| 6,487,170 B1 | | 11/2002 | Chen et al. | |

(Continued)

FOREIGN PATENT DOCUMENTS

JP 2002-281060 A 9/2002

OTHER PUBLICATIONS

PCT International Search Report and Written Opinion, PCT Application No. PCT/US2015/027351, Jul. 22, 2015, 12 pages.

(Continued)

*Primary Examiner* — Tri H Phan
(74) *Attorney, Agent, or Firm* — Fenwick & West LLP

(57) ABSTRACT

Embodiments relate to identifying a topology of a network based on information identifying adjacent devices from each of the devices in the network. In one embodiment, each device identifies one or more adjacent devices within one hop and stores information identifying the one or more adjacent devices. A requesting device aggregates information identifying one or more adjacent devices of each device and identifies the topology of the network based on the aggregated information. By each device storing and transmitting information identifying adjacent devices connected within one hop, amount of information stored in each device and bandwidth of information exchanged can be reduced.

20 Claims, 9 Drawing Sheets

(56) References Cited

U.S. PATENT DOCUMENTS

| | | | |
|---|---|---|---|
| 6,614,764 B1* | 9/2003 | Rodeheffer | H04L 12/462 370/254 |
| 7,046,691 B1 | 5/2006 | Kadyk et al. | |
| 7,313,090 B2* | 12/2007 | Rojas | H04L 12/5693 370/229 |
| 7,660,255 B2 | 2/2010 | Berthaud et al. | |
| 7,760,735 B1* | 7/2010 | Chen | H04L 41/12 370/245 |
| 7,769,806 B2* | 8/2010 | Wie | H04L 12/1827 709/200 |
| 7,995,489 B2* | 8/2011 | Ayyagari | H04W 40/24 370/252 |
| 8,358,651 B1 | 1/2013 | Kadosh et al. | |
| 8,391,289 B1 | 3/2013 | Yalagandula et al. | |
| 8,429,296 B2* | 4/2013 | Ellis | H04L 12/18 709/243 |
| 8,451,846 B1 | 5/2013 | Ayyangar | |
| 8,498,297 B2* | 7/2013 | Bragg | H04L 45/54 370/386 |
| 2002/0126671 A1 | 9/2002 | Ellis et al. | |
| 2002/0176359 A1 | 11/2002 | Durinovic-Johri et al. | |
| 2004/0006613 A1 | 1/2004 | Lemieux et al. | |
| 2004/0062266 A1 | 4/2004 | Rojas et al. | |
| 2004/0073715 A1 | 4/2004 | Folkes et al. | |
| 2004/0170124 A1 | 9/2004 | De Clercq et al. | |
| 2004/0247317 A1* | 12/2004 | Sadananda | H04L 45/02 398/57 |
| 2005/0018670 A1 | 1/2005 | Shigematsu et al. | |
| 2005/0036452 A1 | 2/2005 | Banerjee et al. | |
| 2005/0100010 A1 | 5/2005 | Jain et al. | |
| 2006/0056424 A1 | 3/2006 | Lih et al. | |
| 2006/0153193 A1 | 7/2006 | Kim et al. | |
| 2006/0168320 A1 | 7/2006 | Kidd et al. | |
| 2006/0262753 A1 | 11/2006 | Cho et al. | |
| 2006/0268735 A1 | 11/2006 | McAllister et al. | |
| 2007/0043558 A1 | 2/2007 | Schwarz et al. | |
| 2007/0047540 A1 | 3/2007 | Bragg et al. | |
| 2007/0127367 A1 | 6/2007 | Ogasahara et al. | |
| 2007/0153764 A1 | 7/2007 | Thubert et al. | |
| 2007/0171841 A1 | 7/2007 | Witzel et al. | |
| 2007/0195715 A1 | 8/2007 | Yamano et al. | |
| 2007/0211667 A1 | 9/2007 | Agrawal et al. | |
| 2007/0214412 A1* | 9/2007 | Arquie | H04L 41/12 715/210 |
| 2007/0286217 A1 | 12/2007 | Miyata | |
| 2008/0013534 A1 | 1/2008 | Tsuzuki et al. | |
| 2008/0232262 A1 | 9/2008 | Beygelzimer et al. | |
| 2009/0073924 A1 | 3/2009 | Chou | |
| 2009/0113066 A1 | 4/2009 | Van Wie et al. | |
| 2009/0116404 A1* | 5/2009 | Mahop | H04L 41/0213 370/254 |
| 2010/0004014 A1 | 1/2010 | Coulombe | |
| 2010/0124176 A1 | 5/2010 | Fan et al. | |
| 2010/0161325 A1 | 6/2010 | Hellwig et al. | |
| 2010/0208621 A1 | 8/2010 | Morper | |
| 2010/0305943 A1 | 12/2010 | Witzel et al. | |
| 2011/0299396 A1 | 12/2011 | Yan et al. | |
| 2011/0310734 A1 | 12/2011 | Mizukoshi | |
| 2012/0044985 A1 | 2/2012 | Tao et al. | |
| 2012/0170590 A1 | 7/2012 | Chung et al. | |
| 2012/0185600 A1 | 7/2012 | Belling et al. | |
| 2012/0281551 A1 | 11/2012 | Alanara | |
| 2013/0232273 A1 | 9/2013 | Lawn | |
| 2013/0250810 A1 | 9/2013 | Ho et al. | |
| 2013/0258935 A1 | 10/2013 | Zhang et al. | |
| 2013/0272262 A1 | 10/2013 | Li et al. | |
| 2013/0315152 A1 | 11/2013 | Ratasuk et al. | |
| 2013/0336302 A1 | 12/2013 | Lee et al. | |
| 2014/0101328 A1 | 4/2014 | Coulombe | |
| 2014/0241345 A1 | 8/2014 | DeCusatis et al. | |
| 2014/0286317 A9* | 9/2014 | Agrawal | H04L 5/023 370/335 |
| 2014/0328323 A1 | 11/2014 | Zhang et al. | |
| 2015/0207677 A1* | 7/2015 | Choudhury | H04L 41/0806 370/254 |

OTHER PUBLICATIONS

PCT International Search Report and Written Opinion, PCT Application No. PCT/US2015/023711, Jun. 29, 2015, 17 pages.

* cited by examiner

Discovery 1 Payload

| Generation Count 720 | Max TTL 730 | Current TTL 740 | Capability 750 | Number of Ports 760 | Port Type 770A | ... | Port Type 770N |

FIG. 7

Discovery 2 Payload

| Generation Count 820 | Current TTL 840 | Number of Port 860 | Network Description 850 | Port Type 870 | Port ID 880 | Network ID 890 |

FIG. 8

NETWORK TOPOLOGY DISCOVERY

RELATED APPLICATION

This application claims the benefit of priority under 35 U.S.C. §119 (e) to U.S. Provisional Application No. 61/989,411 filed on May 6, 2014, which is incorporated by reference in its entirety.

FIELD

Embodiments of the invention generally relate to the field of networks and, more particularly, to identification of network topology.

BACKGROUND

The transmission of data (such as media data) from a source device to a sink device involves the establishment of a data stream between the source device and the sink device, and possibly through one or more intermediary devices. Among multiple available connection paths via one or more devices, a data path through which the data stream is established can be selected based on information about topology of the network (i.e., arrangements of each device within the network and interconnections between devices). However, in certain network, topology of the network is subject to frequent changes. For example, a new connection may be established between two devices, or an existing connection may be interrupted in the network. Without identifying a current topology of the network, selecting a data path based on outdated information about the network topology may result in an inaccurate solution.

SUMMARY

Embodiments relate to identifying a topology of a network based on information identifying adjacent devices one hop away from each of the devices in the network. Each device identifies one or more adjacent devices within one hop and stores information identifying the one or more adjacent devices. A requesting device aggregates information identifying one or more adjacent devices of each device and identifies the topology of the network based on the aggregated information. By having each device store and transmit information identifying adjacent devices connected within one hop, the amount of information stored in each device and bandwidth of information exchanged can be reduced.

In one embodiment, the requesting device identifies the topology of the network through two phases: a first phase and a second phase. In the first phase, the requesting device causes each device of the network to broadcast a first type of announcement packet comprising information identifying itself. By analyzing the first type of announcement packets broadcasted from other devices, each device identifies an adjacent device connected within one hop. In the second phase, the requesting device causes each of the other devices of the network to transmit a second type of announcement packet comprising information identifying adjacent devices. The requesting device aggregates the second type of announcement packets from the other devices in the network to identify the topology of the network.

In one embodiment, any device in the network can operate as a requesting device. Moreover, any device in the network can interchangeably operate as an announcing device that receives and responds to the request from the requesting device.

In one embodiment, a first device comprises a plurality of ports communicating with second devices and a third device, each of the second devices one hop apart from the first device, the third device coupled to the first device through at least one of the second devices. The topology identification module is coupled to the plurality of ports and receives an announcement packet generated by an announcing device among the third device and the second devices in response to receiving a request packet for requesting a transmission of the announcement packet, the request packet generated by a requesting device among the first device, the second devices and the third device. The announcement packet comprises information identifying the announcing device. The topology identification module is further determines whether the announcing device is one of the second devices or the third device based on the announcement packet. The first device further comprises a storage module that performs the following operations: (i) responsive to determining the announcing device is one of the second devices, store the information identifying the announcing device, and (ii) responsive to determining the announcing device is one of the third device, bypass storing of the information identifying the announcing device.

In one or more embodiments, the topology identification module receives the information identifying adjacent devices of each of the second devices and the third device, and determines arrangements of the second devices and the third device and connections of the second devices and the third device based on the information identifying adjacent devices of each of the second devices and the third device.

In one or more embodiments, the topology identification module further compares a total number of permissible hops in the announcement packet and a current number of hops in the announcement packet to determine whether the announcing device is one of the second devices or the third device. The current number of hops is increased or decreased each time the announcement packet is transmitted between devices.

In one or more embodiments, the storage module stores a global event count value indicating a number of changes in the network topology or a device capability of the first device or any device communicatively coupled to the first device. The global event count value is shared with the second devices and the third device. The global event count is incremented every time a device is connected to or disconnected from the network or advertised capabilities of a device change. The announcement packet includes a local event count value corresponding to the global event count value at which the announcement packet is generated by the announcing device. The topology identification module further (i) compares the stored global event count value and the local event count value of the announcement packet, and (ii) determines whether to discard the announcement packet based on the comparison.

In one or more embodiments, the storage module further discards the announcement packet responsive to the event count value being less than or equal to the stored global event count value.

In one or more embodiments, the storage module stores a global event count value indicating a number of changes in the network topology or a device capability of the first device or any device communicatively coupled to the first device. The global event count value is shared with the second devices and the third device. The topology identification module further receives an additional request packet generated by an additional requesting device among the third device and the second devices to request a transmission of an announcement packet of the first device. The additional request packet includes a local event count value corresponding to the global event count value at which the additional request packet is generated by the additional requesting device. The topology identification module further discards the additional request packet having the local event count value equal to the stored global event count value.

In one or more embodiments, the topology identification module further transmits the request for the transmission of the announcement packet to the second devices and the third device.

In one or more embodiments, the topology identification module further generates a list of the second devices based at least in part on the information identifying the announcing device.

In one or more embodiments, the requesting device is the first device, and the topology identification module further transmits the request packet of the first device responsive to (i) detecting a change of a connection status of at least one port of the topology identification module, (ii) detecting a change of a device capability of one of the third device and the second devices or (iii) receiving an instruction to identify arrangements and connections of the first device, the second device, and the third device.

In one or more embodiments, the topology identification module further transmits another request to each of the second devices and the third device for a transmission of information identifying adjacent devices. The topology identification module also receives the information identifying adjacent devices of each of the second devices and the third device. Additionally, the topology identification module identifies arrangements of the second devices and the third device and connections of the second devices and the third device based on the information identifying adjacent devices of each of the second devices and the third device.

In one or more embodiments, the first device communicates with one of the second devices through a point-to-point communication protocol complying with Mobile High-Definition Link (MHL) standard.

BRIEF DESCRIPTION OF THE DRAWINGS

The teachings of the embodiments disclosed herein can be readily understood by considering the following detailed description in conjunction with the accompanying drawings.

FIGS. 7 and 8 are diagrams illustrating example payloads of different types of announcement packets, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality.

Embodiments relate to identifying a topology of a network by compiling information identifying adjacent devices from each of the devices in the network. Each device determines and stores information identifying adjacent devices connected within one hop. A requesting device obtains information of adjacent devices of each device, and identifies the topology (i.e., arrangements of each device within the network and interconnections between devices) of the network by collectively analyzing the information obtained. A requesting device in the network may discover a topology of the network through two phases. In a first phase, the requesting device causes each device to identify adjacent devices within one hop. In a second phase, the requesting device collects information identifying one or more adjacent devices of each device and identifies the topology of the network.

An adjacent device of another device herein refers to a device that is within one hop distance away from the other device within a network.

A hop of a destination device as used herein refers to a number of physical devices away from a source device to reach the destination device. For example, two devices directly connected to each other without any intermediary device in between are one hop away from each other. For another example, two devices connected through one intermediary device in between are two hops away from each other.

Example Network Topology

Figure 1:
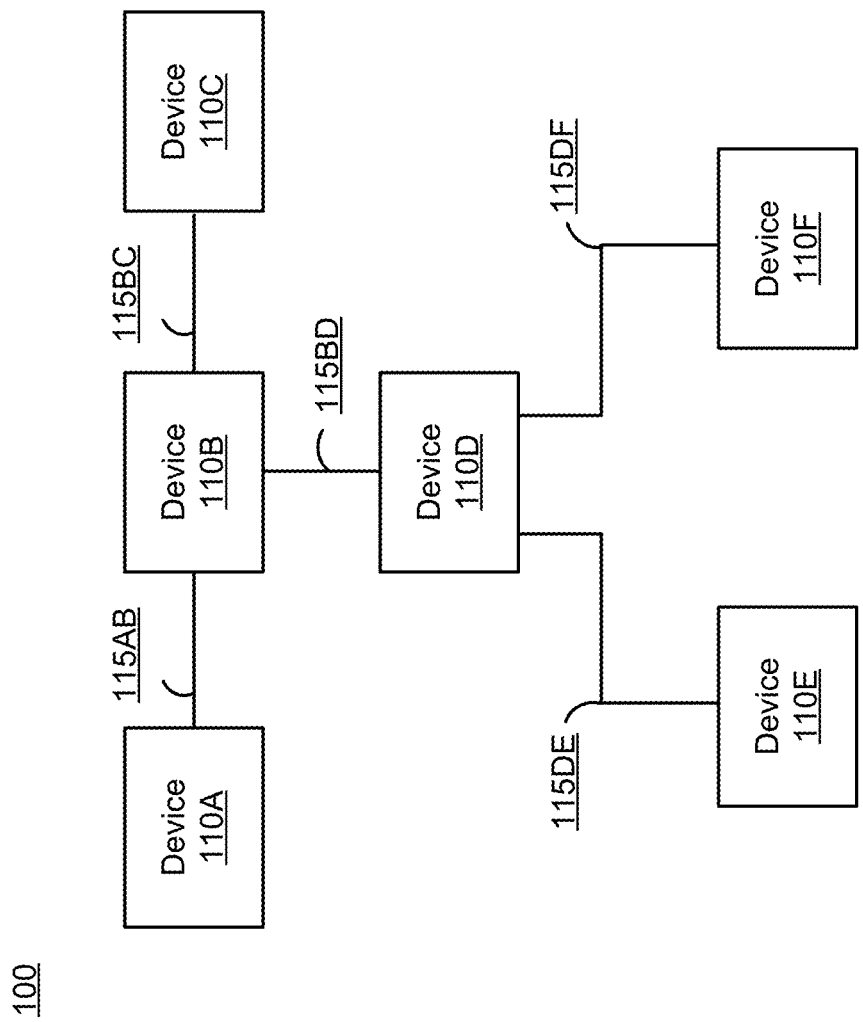
FIG. 1 is a block diagram illustrating a network topology, according to one embodiment.

FIG. 1 is a block diagram illustrating a network topology, according to one embodiment. A network can include a personal entertainment network, such as a network in a household, a network in a business setting, or any other network of devices and/or components. Examples of networks include a Local Area Network (LAN), Wide Area Network (WAN), Metropolitan Area Network (MAN), intranet, the Internet, etc.

In the example network 100 of FIG. 1, six devices 110A through 110F (hereinafter collectively referred to as "the devices 110") are communicatively coupled. A device 110A is communicatively coupled to a device 110B through a connection 115AB. A device 110B is additionally communicatively coupled to a device 110C through a connection 115BC and a device 110D through a connection 115BD, respectively. The device 110D is also communicatively coupled to a device 110E through a connection 115DE, and a device 110F through a connection 115DF, respectively. Each of the devices 110A through 110F in FIG. 1 can be the same type or configuration of computing device, or can be a different type or configuration of computing device than one or more other devices. Finally, the type of each connection 115 within the network 100 can be the same, or can be different from one or more other device connections.

Each of the devices 110 within the network can transmit and receive data through a connection 115 using any suitable technology, such as Serial ATA ("SATA"), Frame Information Structure ("FIS"), High-Definition Multimedia Interface ("HDMI"), Mobile High-Definition Link ("MHL"), Category-5 or Category-6 cable, co-axial cable, or any other suitable networking technology. In addition to wired connections between devices, devices within a network can be wireless, utilizing technologies such as Wi-Fi, Wi-Max, Bluetooth, LTE, and the like.

Each of the devices 110 is a computing device configured to transmit or receive data from one or more other devices within the network 100. Examples of devices include computers (such as specially configured desktop computers, laptop computers, table computers, and the like), servers (such as specially configured web servers, internet media streaming services, databases, etc.), mobile devices (such as specially configured mobile phones, and the like), media devices (such as specially configured media servers, televisions and other displays, speakers, theater equipment, cable boxes, tuner devices, video game consoles, DVD- and Blu-Ray players, and the like), storage devices (such as specially configured hard drives, cloud storage devices, video and audio storage devices, and the like), or any other suitable computing device specially configured to communicate with other network devices to establish data streams and receive/transmit data as described herein. The data can include digital media content (including music data, audio/video data, gaming data, digital images, and the like), but can also include any other suitable type of data, including but not limited to text data, social networking system data, mobile phone or device data, communications data, spreadsheet data, and the like.

In the network 100, certain devices may be a source of data, such as a digital television tuner, cable set-top box, a mobile device (such as a smart phone), video storage server, and the like. Such devices are referred to herein as "source devices". Other devices may receive, display, use, or store media content, such as a digital television, home theater system, audio system, gaming system, video and audio storage server, and the like. Such devices are referred to herein as "sink devices". In one embodiment, any device can operate as a source device or a sink device.

A source device transmits data stream to a sink device through a data path. A data path refers to an ordered set of devices and associated device connections through which data corresponding to a data stream is transmitted and/or received. For example, a data path can include the ordered set {110A, 110B, 100C}, through which data is transmitted by the source device 110A, received and re-transmitted at the intermediary device 110B, and received at the sink device 110C. For an optimal data transmission, a topology of the network 100 is considered for selecting a data path. Specifically, a number of hops, type, bandwidth, or latency of available connections, capability of devices can be considered for selecting a data path.

Among the devices 110 in the network 100, one or more requesting devices identify a network topology. A requesting device broadcasts a request to other devices in the network to broadcast information identifying the other devices or adjacent devices of each of the other devices. In response to the request from the requesting device, other devices in the network broadcasts requested information. The requesting device may also broadcast information identifying itself. A device that transmits information identifying the device or its adjacent device to another device is herein referred to as an "announcing device."

In one embodiment, any device can operate as a requesting device or an announcing device. Assuming, for an example, that device 110A is a mobile device (e.g., a smart phone), a device 110B is an audio video receiver (AVR), device 110C is a cable set top box, device 110D is a display television (TV), device 110E is a gaming console, and device 110F is a cable set top box. The display television 110D receives a request from a user to identify the network topology, and may operate as a requesting device. In another example, the mobile device 110A establishes a new connection 115AB to the AVR 110B and joins the network 100, and may operate as a requesting device to identify the topology of the network 100 or may operate as an announcing device to broadcast information identifying itself (110A). In yet another example, the AVR 110B detects a new connection 115AB with the mobile device 110A and operates as a requesting device. Other devices in the network 100 responding to the request of the requesting device operate as announcing devices.

For identifying a topology of the network 100, a requesting device (e.g., a source device or a sink device) in the network 100 collects information of each device and connecting relationship through two phases. In a first phase (herein also referred to as "a discovery 1 phase"), each device identifies adjacent devices within one hop based on information broadcasted from other devices. In a second phase (herein also referred to as "a discovery 2 phase"), the requesting device assembles, from each device, information identifying adjacent devices, and identifies a topology of the network 100 based on the information identifying adjacent devices aggregated from different devices 110.

In the first phase, the requesting device broadcasts a first type of request packet to request each device to identify itself. In response to receiving the request packet from the requesting device, each device forwards the first type of request packet to devices connected to available ports except to the device connected to a port from which the request packet was received, and broadcasts the first type of announcement packet identifying itself to other devices. Each device receiving a first type of announcement packet analyzes the distance the announcement packet has traveled to determine whether the announcing device generating the announcement packet is an adjacent device. Additionally, each device receiving the first type of announcement packet forwards the first type of announcement packet to devices connected to available ports except to a device connected to a port from which the announcement packet was received. The requesting device may also operate as an announcing device after broadcasting the requests in the first phase.

In the second phase, the requesting device identifies a complete topology of the network by analyzing adjacent devices of each device identified in the first phase. The requesting device may initiate the second phase of the network topology discovery process after a predetermined time. Alternatively, the requesting device may initiate the second phase of the network topology discovery process any time after all adjacent devices are known. The requesting device generates and unicasts (or broadcasts) a second type of request packet for requesting one or more announcing devices in the network to transmit a second type of announcement packet identifying adjacent devices within one hop. An announcing device may be a destination device of the second type of request packet. Additionally, announcing devices may be any intermediary devices between the requesting device and the destination device en route. In response to receiving the second type of announcement packet, the announcing device transmits to the requesting device (or broadcasts) the second type of announcement packet. The requesting device collects the second type of announcement packets and identifies the topology of the network by analyzing connection relationships.

In one embodiment, the request packet, announcement packet, or both may be unicasted instead of being broadcasted.

Example Device

Figure 2:
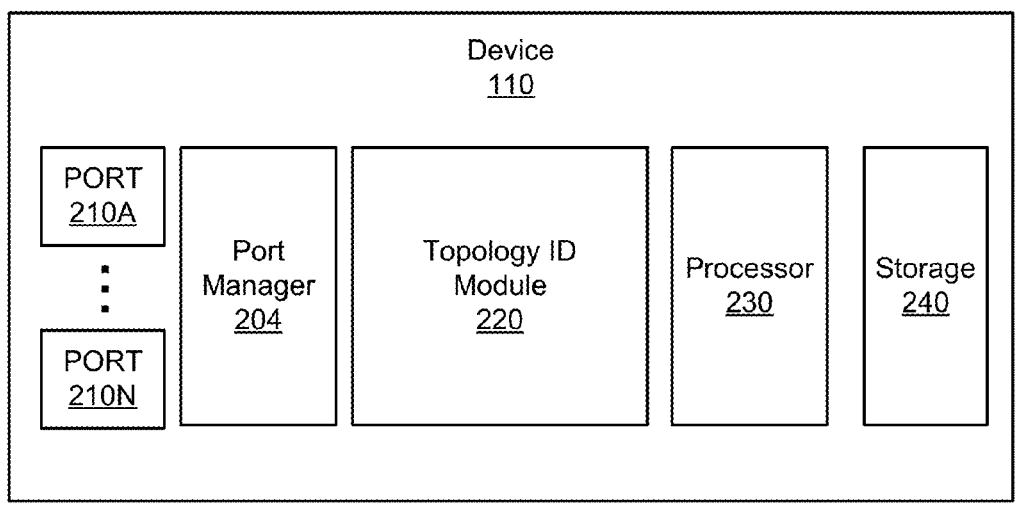
FIG. 2 is a block diagram illustrating a network device, according to one embodiment.

FIG. 2 is a block diagram illustrating a network device 110, according to one embodiment. In the embodiment of FIG. 2, the device 110 includes one or more ports 210A through 210N, a topology identification module 220, a processor 230, and storage 240. In other embodiments, a device 110 can include additional components, for example, a route selection module for selecting an optimal data path, a content communication module for transmitting and receiving contents, and a display for providing images to a user, and etc.

Each port 210 is a physical interface that enables connection between the device 110 and other devices in the network 100. A port 210 with a valid connection to another device 110 is communicatively coupled to another port of the other device. Through the port 210, the device 110 exchanges data with other devices.

The port manager 204 can identify which ports are communicatively coupled to other devices, and which ports are disconnected to other devices. For example, if a device has five communicative ports, two of which are communicatively connected to two other devices one hop away respectively, the port manager 204 can identify the two ports with established connections to the other two devices. In case a new connection is established using a port 210, the port manager 204 detects which port has established a new connection. Similarly, in case an existing connection to a port 210 is disabled, the port manager 204 detects which port has lost a connection. In one embodiment, the port manager 204 detects a change in a connection status of one or more ports 210 and causes the device 110 to operate as the requesting device or an announcing device according to the detected connection status.

The topology identification module 220 discovers the topology of a network. The topology identification module 220 is employed by either a requesting device or an announcing device. The topology identification module 220 of a requesting device initiates a first phase or a second phase of the network topology discovery process by generating a request packet corresponding to the phase. The topology identification module 220 of an announcing device receives the request packets and responds according to request packets received. The topology identification module 220 of the requesting device gathers the announcement packets and identifies the network topology.

The topology identification module 220 of a requesting device generates request packets (either a first type or a second type) and broadcasts (or unicasts) the request packets to other devices. The first type of request packet comprises a header with the opcode that causes each device receiving the first type of request packet to broadcast information identifying itself. Similarly, the second type of request packet comprises a header with the opcode that causes each device receiving the second type of request packet to broadcast (or unicast) information identifying adjacent devices.

The topology identification module 220 of an announcing device in the first phase broadcasts a first type of announcement packet. The first type of announcement packet of a device includes, for example, a device ID (a unique number identifying the device), and a description of each network interface on the device including a type, address, available bandwidth into the interface, available bandwidth out of the interface, a bitmap describing basic device capabilities (e.g. SOURCE, SINK), initial value of the TTL field (TTLMAX), a current value of the TTL field, and a generation count (herein also referred to as "an event count").

The topology identification module 220 receives a first type of announcement packets generated by other devices in the network, and identifies an adjacent device one hop away in the first phase of the network topology discovery process. In one embodiment, the topology identification module 220 compares the maximum TTL value and the current TTL value in the received announcement packet to determine whether the announcing device is an adjacent device. The maximum TTL value is a fixed total number of permissible hops generated by an announcing device, whereas the current TTL value is a current number of hops reflecting the number of hops the announcement packet has traveled. By comparing the maximum TTL and the current TTL, the topology identification module 220 can determine the number of hops that the announcement packet has traveled, and also can determine whether the announcing device is one hop away or not. After determining whether the announcing device is the adjacent device or not, the topology identification module 220 forwards the announcement packet to other devices connected to available ports 210 other than a device connected to a port from which the announcement packet was received. An example of a first type of announcement packet is described in detail with respect to FIG. 7.

The topology identification module 220 of the announcing devices generates a second type of announcing packet identifying adjacent devices identified in the first phase in response to the receiving the second request packet. In one example, the second type of announcement packet includes a device ID of the device generating the announcement packet, a description of each connection attached to the device including a lowest device ID of one of the announcing device and an adjacent device, and TTL field (TTL). The second type of announcement packet contains minimal information that is sufficient to enable the requesting device to identify the topology of the network, when all the second type of announcement packets from the other devices in the network are collectively analyzed. An example of a second type of announcement packet is described in detail with respect to FIG. 8.

The topology identification module 220 of the requesting device receives the second type of announcement packets from other devices in the network, and determines the topology of the network in the second phase. The topology identification module 220 derives the connection between each device based on the second type of announcement packets, and constructs the complete network topology.

In certain cases when two or more communication paths exist between two devices, a device may receive identical messages (e.g., an announcement packet or a request packet) more than once. The device may receive duplicate messages (i.e., identical message received during a same time period) through difference communication routes. The device may also receive a message at a time period, and at a later time period may receive an old message to which the message received earlier is identical.

To eschew processing an old announcement, a duplicate announcement or a duplicate request, the topology identification module 220 shares a global generation count (herein also referred to as "a global event count") with other devices, and compares the global generation count and the generation count of a message (e.g., the announcement packet or the request packet). The global generation count represents a total number of changes in the network topology and/or advertised device capability among all the devices in the network. The generation count represents the total number of changes in network topology or advertised device capability at the time the announcement packet was generated by the announcing device. By comparing the global generation count and the generation count of the received message, the topology identification module 220 can identify duplicate or old messages. In one example, the topology identification module 220 discards the duplicate request, but not the old request. In another example, the topology identification module 220 discards the duplicate announcement and the old announcement. An old announcement is obsolete and may not carry useful information, therefore may be discarded. On the other hand, an old request is indicative of a device generating the old request does not have current information of other devices in the network, for example because the device with old generation count just became connected to the network. Therefore, a device receiving the old request responds to the old request to enable the requesting device to obtain current information of other devices in the network.

In one embodiment, the topology identification module 220 and the port manager 204 can be implemented by fixed function hardware, reconfigurable circuitry, such as an FPGA, a processor configured with instructions, or a combination of these. The topology identification module 220 and the port manager 204 can be implemented by a processor (e.g., 230) executing the actions associated therewith under software control, reconfigurable logic configured by configuration data, or circuitry that implements the actions recited. For example, in an embodiment, topology identification module 220 can be implemented by circuitry that performs the actions disclosed with respect thereto. The circuitry can be implemented as fixed function circuitry, or circuitry that is configured to perform the actions.

The processor 230 executes instructions to operate the port manager 204, and topology identification module 220. The processor 230 may be hardware or a combination of hardware and software. The processor 230 may receive instructions from the storage 240.

Figure 3:
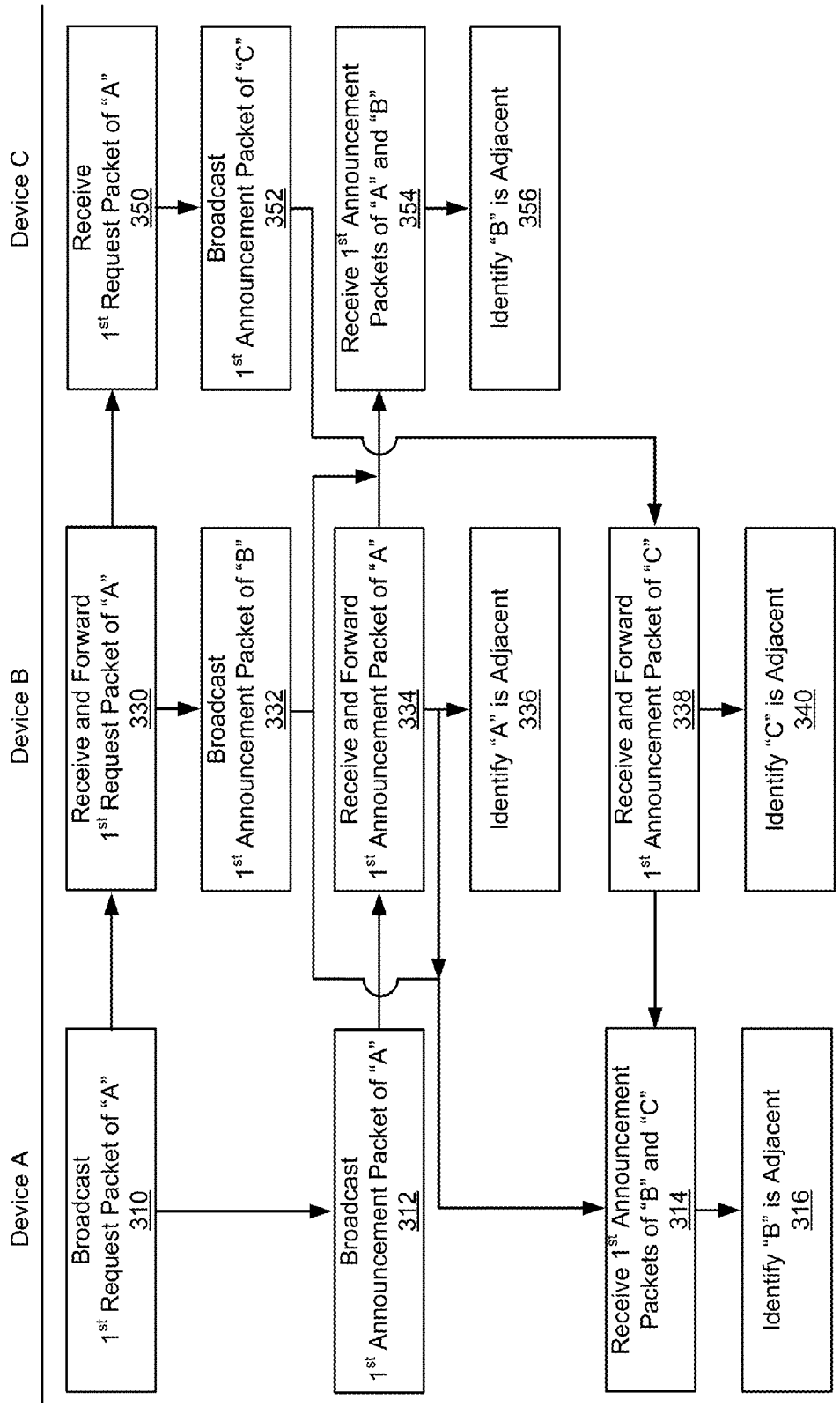
FIG. 3 is an interaction diagram illustrating a first phase of a topology discovery process of an example network, according to one embodiment.

FIG. 3 is an interaction diagram illustrating a first phase of a topology discovery process of an example network, according to one embodiment. In FIG. 3, a process of three devices A, B, and C performing network topology discovery is included. In this example, the device A operates as a requesting device, and devices B and C operate as announcing devices. Although only three devices A, B, and C are included in this example for the simplicity, in other embodiments, more number of devices may be included and operate under the same principle.

The device A causes devices B and C to identify adjacent devices in a discovery 1 phase. The device A generates and broadcasts 310 a first type of request packet. Additionally, the device A operates as an announcing device and broadcasts 312 a first type of announcement packet (herein also referred to as a discovery 1 announcement) of the device A including information identifying the device A to the device B.

The device B operating as an announcing device receives 330 the first type of request packet from the device A. In response to receiving the first type of request packet, the device B broadcasts 332 a first type of announcement packet of the device B identifying the device B. In addition, the device B forwards the first type of requested packet generated by the device A to the device C.

The device B receives 334 the first type of announcement packet generated by the device A. Based on the announcement packet (e.g., by comparing the maximum TTL and the current TTL), the device B identifies 336 the device A as an adjacent device and stores information identifying the device A. In addition, the device B forwards the first type of announcement packet of the device A to the device C.

The device C operating as another announcing device receives 350 the first type of request packet generated by the device A through the device B. In response to receiving the first type of request packet, the device C broadcasts 352 a first type of announcement packet of the device C identifying the device C. If another device other than device B was attached to the device C, the device C forwards the first type of requested packet generated by the device A to the other device.

The device C receives 354 the first type of announcement packets generated by the devices A and B. Based on the first type of announcement packet of the device A, the device C identifies the device A is not an adjacent device. Responsive to determining that the device A is not an adjacent device, the device C may store information identifying the device A if enough storage space is available or may discard information related to the device A. On the other hand, based on the first type of announcement packet of the device B, the device C identifies 356 the device B as an adjacent device and stores information identifying the device B. If another device other than device B was attached to the device C, the device C forwards the first type of announcement packet generated by the devices A and B to the other device.

The device B receives 338 the first type of announcement packet generated by the device C. Based on the first type of announcement packet of the device C, the device B identifies 340 the device C as another adjacent device and stores information identifying the device C. In addition, the device B forwards the first type of announcement packet of the device C to the device A.

The device A receives 314 the first type of announcement packets generated by the devices B and C. Based on the first type of announcement packet of the device C, the device A identifies the device C is not an adjacent device and may store or discard information related to the device C depending on the availability of the storage. On the other hand, based on the first type of announcement packet of the device B, the device A identifies 316 the device B as an adjacent device and stores information identifying the device A.

Figure 4:
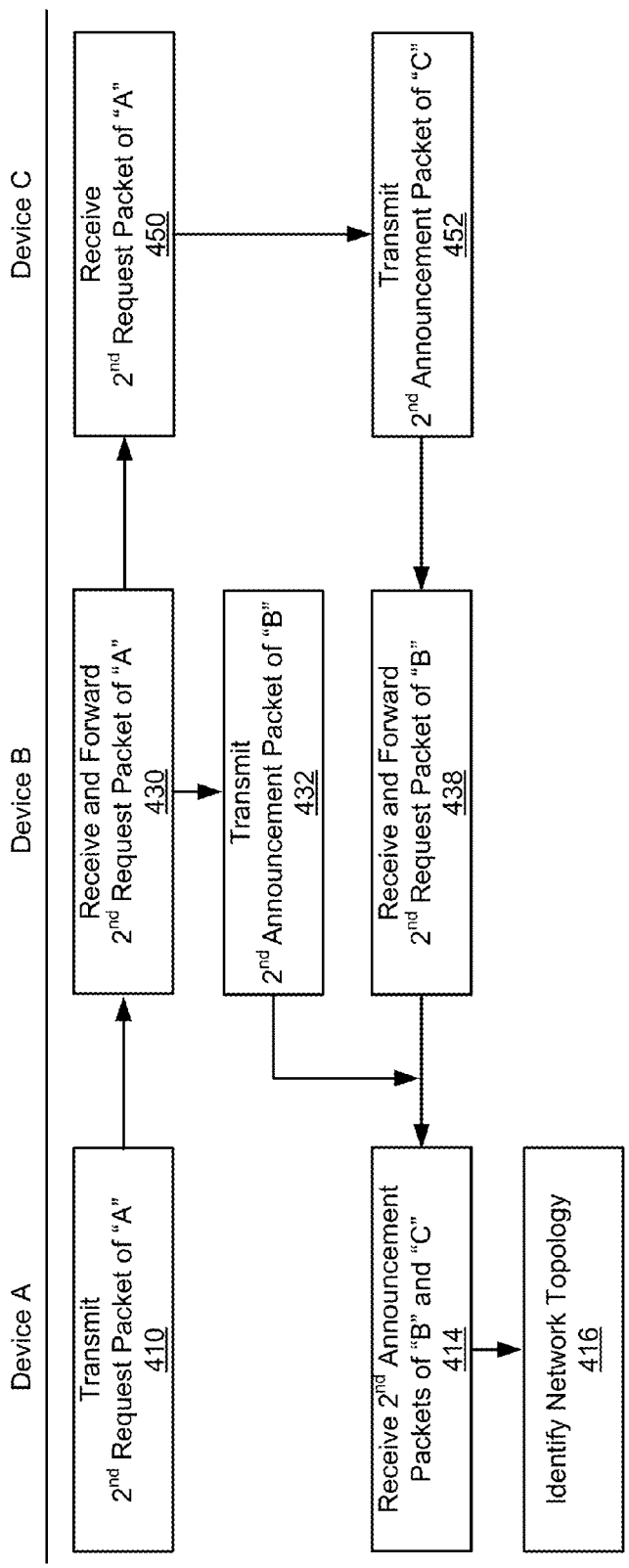
FIG. 4 is an interaction diagram illustrating a second phase of the topology discovery process of the example network of FIG. 3, according to one embodiment.

FIG. 4 is an interaction diagram illustrating a second phase of the topology discovery process of the example network of FIG. 3, according to one embodiment. In FIG. 4, the device A operates as the requesting device to identify the topology of the network.

The device A causes each of devices B and C to transmit (unicast or broadcast) information identifying adjacent devices. The device A generates and transmits 410 a second type of request packet. In case of broadcast, the device A transmits one second type of request packet without a specific destination. In case of unicast, the device A transmits a second type of request packet with the device B as a destination device and another second type of request packet with the device C as a destination device.

The device B operating as an announcing device receives 430 the second type of request packet from the device A. In response to receiving the second type of request packet broadcasted or unicasted for the device B, the device B transmits 432 a second type of announcement packet of the device B identifying adjacent devices A and C. In addition, the device B forwards to the device C the second type of requested packet broadcasted or unicasted with the device C as the destination.

The device C operating as another announcing device receives 450 the second type of request packet generated by the device A through the device B. In response to receiving the second type of request packet, the device C transmits 452 a second type of announcement packet of the device C identifying the adjacent device B. If another device other than the device B was attached to the device C, the device C forwards to the other device the second type of requested packet broadcasted or unicasted with the other device as the destination.

The device B receives 438 the second type of announcement packet generated by the device C, and forwards the second type of announcement packet of the device C to the device A.

The device A receives 414 the second type of announcement packets generated by the devices B and C. The device A identifies 416 the network topology by compiling information identifying adjacent devices of each of the devices B and C.

Figure 5A:
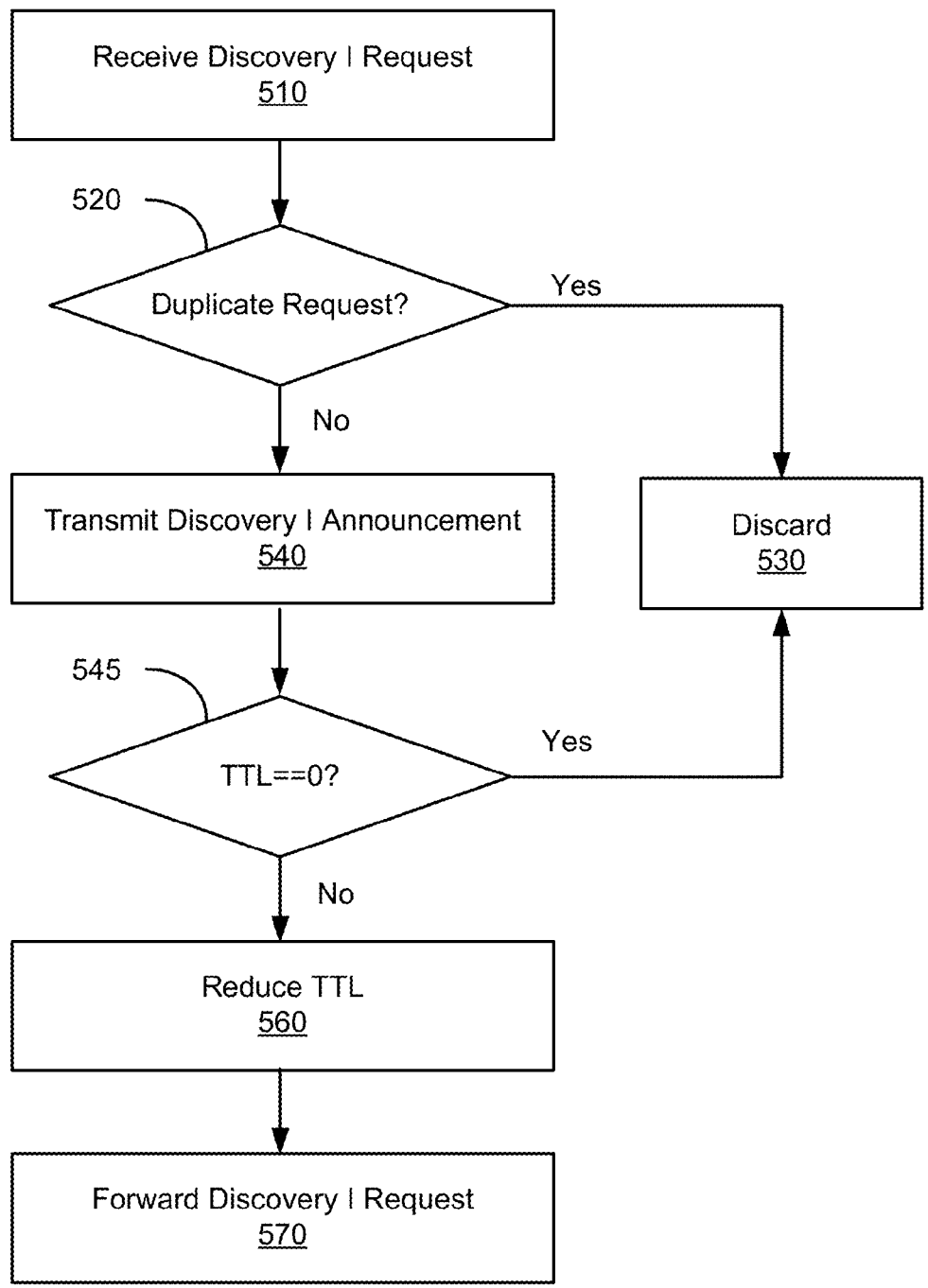
FIGS. 5A and 5B are flow charts illustrating a process of a device responding to different types of request packets, according to one embodiment.

FIG. 5A is a flow chart illustrating a process of a device responding to a first type of request packet (herein also referred to as "a discovery 1 request"), according to one embodiment. The device receives the discovery 1 request and operates as an announcing device in response to the request packet, according to steps illustrated in FIG. 5.

The device receives 510 a discovery 1 request generated by a requesting device. The device determines 520 whether the discovery 1 request is a duplicate request packet. In one approach, the device compares the global generation count and the generation count of the discovery 1 request to determine whether the discovery 1 request is a duplicate request packet. Responsive to determining that the discovery 1 request is a duplicate request, the device discards 530 the discovery 1 request. Responsive to determining that the discovery 1 request is not a duplicate request packet, the device transmits 540 (e.g., broadcasts or unicasts) a first type of announcement packet (herein also referred to as "a discovery 1 announcement").

Subsequent to broadcasting the discovery 1 announcement, the device determines 545 whether the discovery 1 request needs to be forwarded. In one example, if a TTL field of the discovery 1 request is a lower bound (e.g., '0'), the device determines the discovery 1 request should not be forwarded. If the TTL field of the discovery 1 request is greater than the lower bound (e.g., '0'), the device determines the discovery 1 request should be forwarded. Responsive to determining that the request packet should not be forwarded, the device discards 530 the discovery 1 request. Responsive to determining that the discovery 1 request should be forwarded, the device reduces 560 TTL value, then forwards 570 the discovery 1 request to other devices connected to available ports of the device other than a device connected to a port from which the discovery 1 request is received. After forwarding the discovery 1 request or after discarding the discovery 1 request, the device may wait for a discovery announcement or another discovery request.

In one embodiment, the device maintains a routing table in the storage 240. The routing table can be used to transmit or forward any requests or announcements. For every discovery1 announcement received, the total distance the announcement has traveled from the announcing device to a port of the receiving device is noted. If it is the shortest route of any current discovery1 announcement received from that device through that port, and there is sufficient space available, then the device stores that path length, the device ID, and the port. If a shorter path between one device and another device can be identified, the routing table in the storage 240 is updated. The routing table may be updated based on bandwidth, length, and latency of one or more connections through which the announcement packet has been transmitted.

Figure 5B:
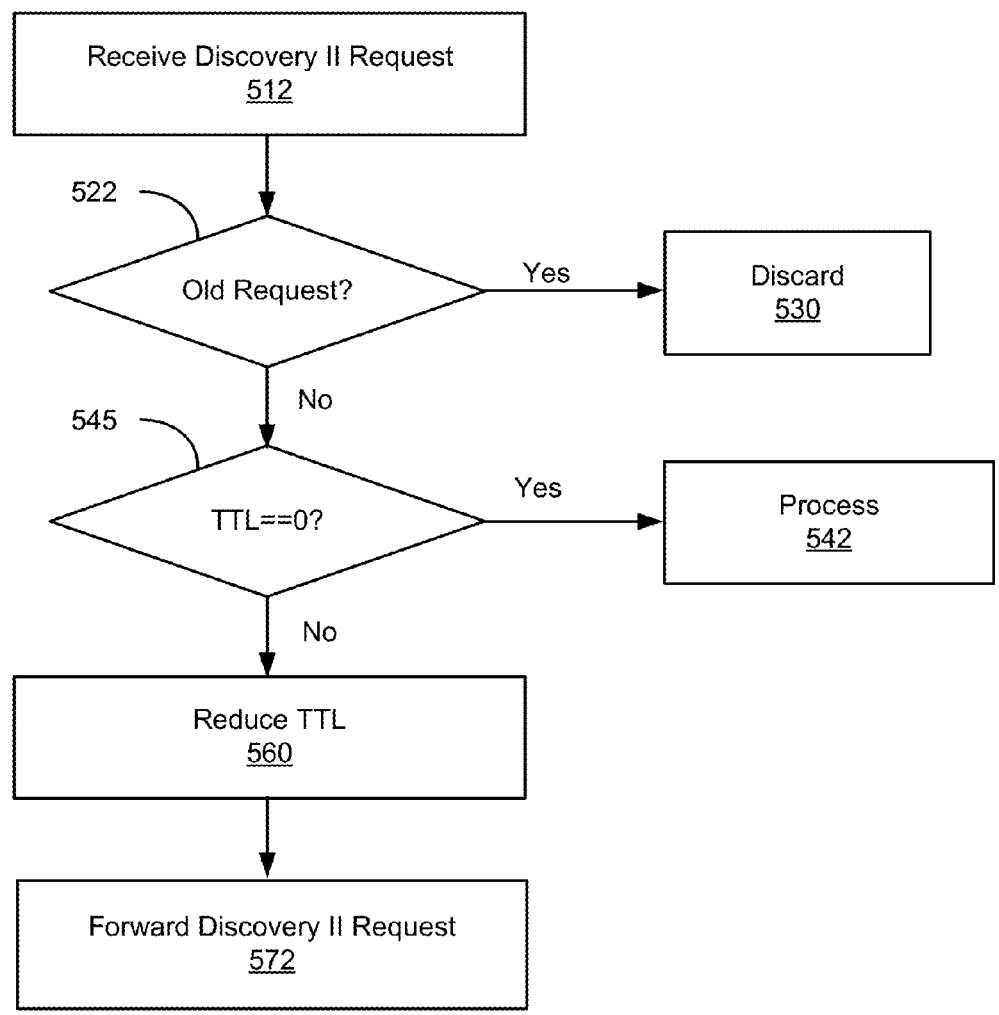

FIG. 5B is a flow chart illustrating a process of a device responding to a second type of request packet (herein also referred to as "a discovery 2 request"), according to one embodiment.

The device receives 512 a discovery 2 request generated by the requesting device. The device determines 522 whether the discovery 2 request is an old request packet. In one approach, the device compares the global generation count and the generation count of the discovery 2 request to determine whether the discovery 2 request is an old request packet. Responsive to determining that the discovery 2 request is an old request, the device discards 530 the discovery 2 request. Responsive to determining that the discovery 2 request is current (not old), the device determines 545 whether the discovery 2 request needs to be forwarded based on the TTL field as described in detail with respect to FIG. 5A.

Responsive to determining that the request packet should not be forwarded, the device processes 542 the request. If the device determines the request is intended for the device, the device transmits (e.g., broadcasts or unicasts) the second type of announcement packet (herein also referred to as "a discovery 2 announcement") to the requesting device. If the device determines the request is not intended for the device, the device may discard the request.

Responsive to determining that the discovery 2 request should be forwarded, the device reduces 560 TTL value, then forwards 572 the discovery 2 request to another device connected to an available port of the device with the lowest hop counts to the destination device. The device may process the discovery 2 request prior to reducing the TTL value. After forwarding the discovery 2 request, the device may wait for a discovery announcement or another discovery request.

Figure 6A:
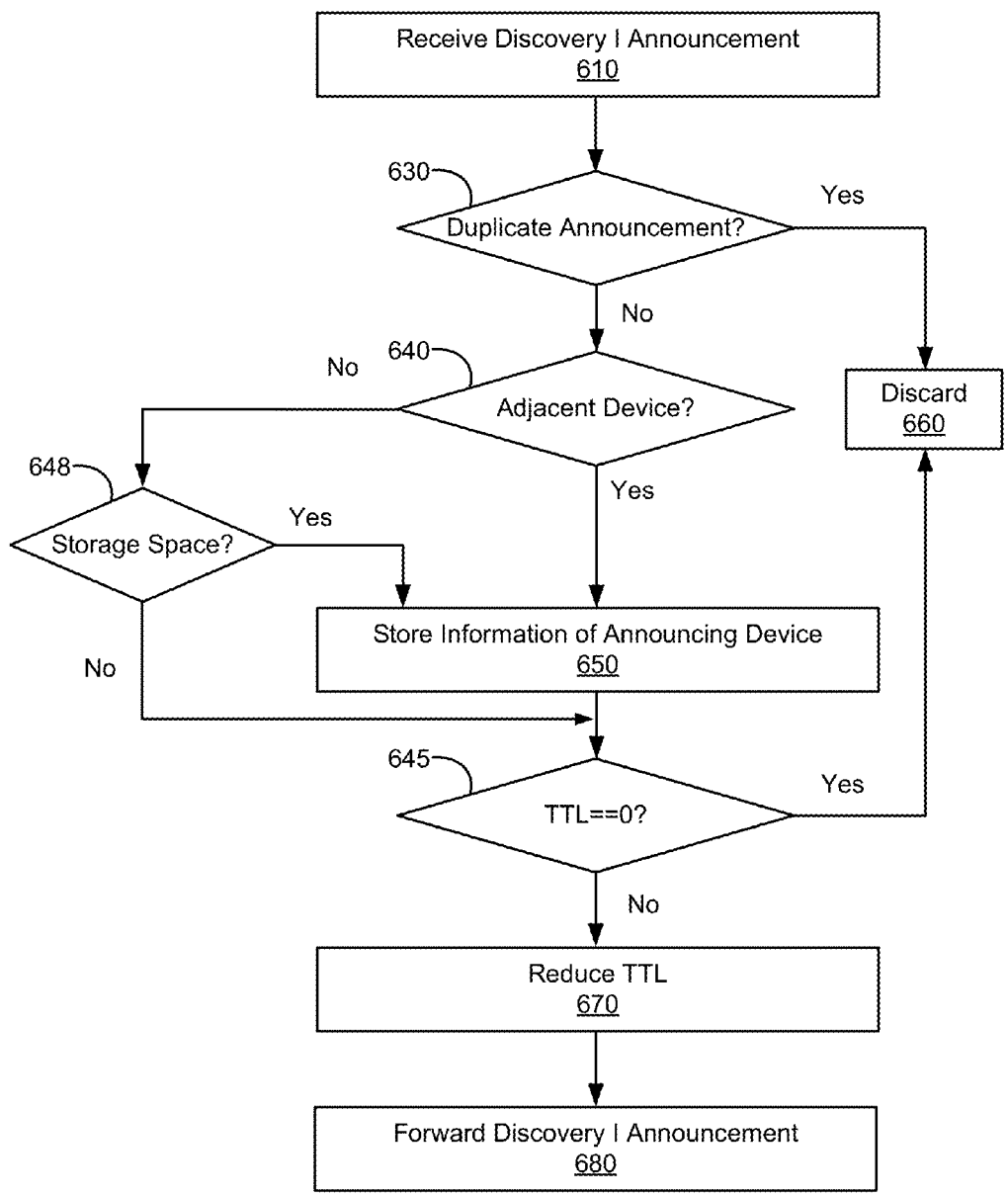
FIGS. 6A and 6B are flow charts illustrating a process of a device responding to different types of announcement packets, according to one embodiment.

FIG. 6A is a flow chart illustrating steps of processing a discovery 1 announcement, according to one embodiment. The device receives the discovery 1 announcement and processes the discovery announcement, according to steps illustrated in FIG. 6A.

The device receives 610 a discovery 1 announcement generated by an announcing device. The device determines a type of the discovery announcement received. The type of the discovery announcement may be indicated by the opcode field of the discovery announcement. In case the discovery announcement is the second type of announcement packet, the device operates as described in detail with respect to FIG. 6B.

If the discovery announcement is the first type of announcement packet, the device determines 630 whether the announcement packet is a duplicate or an old announcement packet. In one example, the device compares the global generation count and the generation count of the discovery announcement to determine whether the discovery announcement is a duplicate. If the discovery 1 announcement is a duplicate announcement packet, the device discards 660 the announcement 1 packet. If the announcement 1 packet is not a duplicate announcement packet, the device identifies 640 whether the announcing device generating the announcement packet is an adjacent device.

If the announcing device is an adjacent device, the device stores 650 information identifying the announcing device in the storage 240. If the announcing device is not an adjacent device, the device determines 648 whether enough storage space is available. If not enough storage space is available, the device may bypass storing information of the announcing device that is not adjacent in the storage 240 and proceeds to step 645. Alternatively, the device may store information of the announcing device that is not adjacent, if enough storage space is provided.

In step 645, the device determines whether the discovery 1 announcement needs to be forwarded. The process of determining whether the discovery 1 announcement should be forwarded is similar to the process of determining whether the discovery request should be forwarded in FIGS. 5A and 5B. Therefore, the detailed description thereof is omitted herein for the sake of brevity. Responsive to determining the discovery 1 announcement should not be forwarded, the device discards 660 the discovery 1 announcement. Responsive to determining the discovery 1 announcement should be forwarded, the device reduces 670 the current TTL value of the discovery 1 announcement, and forwards 680 the discovery 1 announcement to devices connected to available ports except to the device connected to a port from which the request packet was received. After forwarding the discovery 1 announcement or after discarding the discovery 1 announcement, the device may wait for another discovery announcement or a discovery request.

Figure 6B:
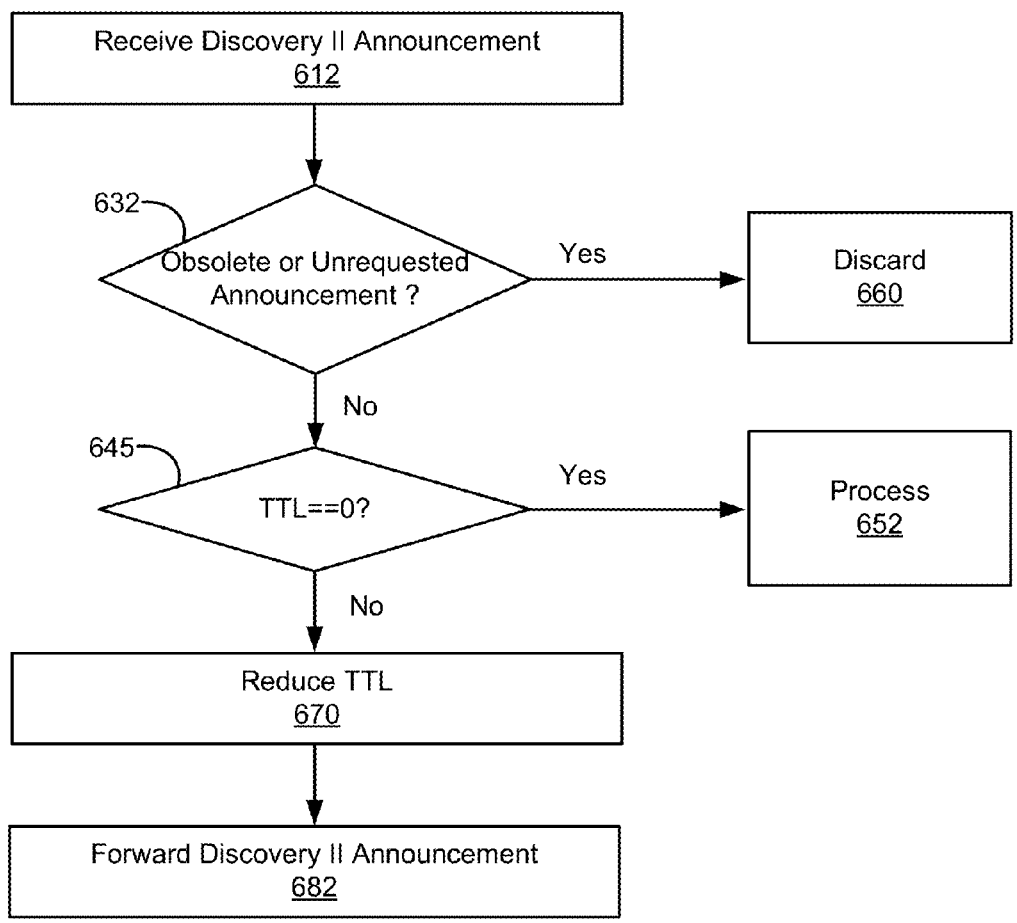

FIG. 6B is a flow chart illustrating a process of responding to a discovery 2 announcement, according to one embodiment. The device receives 612 a discovery 2 announcement generated by an announcing device. If the discovery announcement is the second type of announcement packet, the device determines 632 whether the announcement packet is an obsolete announcement packet or unrequested announcement generated in response to a request from another device. In one example, the device compares the global generation count and the generation count of the discovery announcement to determine whether the discovery announcement is an outdated announcement. If the discovery 2 announcement is an obsolete announcement packet, the device discards 660 the announcement packet. If the discovery 2 announcement is a current announcement packet, the device determines 645 whether the announcement packet needs to be forwarded. The process of determining whether the discovery 2 announcement should be forwarded is same as the process of determining whether the discovery request should be forwarded in FIGS. 5A and 5B. Therefore, the detailed description thereof is omitted herein for the sake of brevity.

Responsive to determining the discovery 2 announcement should not be forwarded, the device 652 processes the discovery 2 announcement. If the discovery 2 announcement is intended for the device, the device stores the discovery 2 announcement. The device aggregates information identifying adjacent devices for each device and determines the topology of the network. If the discovery 2 announcement is not intended for the device, the device may store or discard the received discovery 2 announcement.

Responsive to determining the discovery 2 announcement should be forwarded, the device reduces 670 the current TTL value of the discovery 2 announcement, and forwards 682 the discovery 2 announcement to another device connected to an available port of the device with lowest hop counts to the requesting device. After forwarding the discovery 2 announcement or after discarding the discovery 2 announcement, the device may wait for another discovery announcement or a discovery request. If the discovery 2 announcement was broadcasted, the device reduces the current TTL and forwards the discovery 2 announcement through every port except the one through which it was received. If the discovery 2 announcement was unicasted, the device reduces the current TTL and forwards the discovery 2 announcement to another device connected to an available port of the device. The other device may be a device with the lowest hop count to the destination device, or any intermediary device connected to an available port to the destination device.

The steps and sequences as illustrated in FIGS. 5 and 6 are merely illustrative. For example, identifying the type of announcement packet may be obviated. In one embodiment, the current TTL value is increased rather than being decreased by a predetermined number, prior to forwarding a discovery request in step 570 of FIG. 5A and in step 572 of FIG. 5B or forwarding a discovery announcement in step 680 of FIG. 6A and step 682 of FIG. 6B. In this embodiment, the device determines to forward the discovery request or the discovery announcement, when the current TTL value is less than the maximum TTL value instead of being greater than the lower bound.

FIG. 7 is an example payload of a first type of announcement packet, according to one embodiment. The first type of announcement packet (herein also referred to as a discovery 1 payload") includes information identifying a device generating the announcement packet. In one embodiment, the first type of announcement packet includes a generation count 720, a maximum TTL 730, a current TTL 740, a capability 750, a number of ports 760 and a port type 770A . . . 770N (herein generally referred to as "a port type 770").

The generation count represents the total number of changes in network topology or advertised device capabilities at the time the message (announcement or request) is generated. The generation count can be used to determine whether the announcement packet is an old announcement packet, duplicate announcement packet, or not. The generation count can be also used to determine whether the request packet is an old request packet, duplicate request packet, or not. In one embodiment, the generation count is incremented every time the discovery information changes, or every time the device receives a new first type of request packet. In one example, the generation count is represented in 32 bits.

The maximum TTL 730 is a TTL value generated by the announcing device generating the announcement packet. The maximum TTL 730 remains unchanged even if the announcement packet is forwarded through intermediary devices. In one example, the maximum TTL is represented in 8 bits.

The current TTL 740 represents a number of hops the announcement packet has traveled. In one example, the current TTL 740 is initially set to a maximum TTL value when the announcement is generated by the announcing device, and is reduced by a predetermined number (e.g., '1'), each time the announcement packet is forwarded. Alternatively, the current TTL 740 is initially set to a lower bound (e.g., '0') when the announcement packet is generated by the announcing device, and is increased by a predetermined number (e.g., '1'), each time the announcement packet is forwarded. By comparing the maximum TTL 730 and the current TTL 740, the device can determine whether the announcing device by which the announcement packet is generated is an adjacent device or not. Additionally, the current TTL 740 indicates whether the announcement packet should be forwarded or not. In one example, the current TTL is represented in 8 bits.

The capability 750 indicates which functions the announcing device can perform. For example, the capability 750 indicates whether the announcing device can operate as a source device, a sink device, a requesting device or not. In one example, the capability is represented in different number of bits (e.g., at least 8 bits).

The number of ports 760 indicates a number of ports of the announcing device in ports list, and the port type 770 indicates available type of each port. For example, a port type can be HDMI, MHL1, MHL2, MHL3, superMHL, Ethernet, WiFi, and etc. In one example, the number of ports 760 is represented in 8 bits, and each port type is represented in 8 bits.

FIG. 8 is an example payload of a second type of announcement packet, according to one embodiment. The second type of announcement packet (herein also referred to as "a discovery 2 payload") includes information identifying each connection attached to the announcing device. In one embodiment, the second type of announcement packet includes, for example, a generation count 820, a current TTL 840, a number of ports 860, a network description 850, a port type 870, a port ID 880, and a network ID 890. The generation count 820, the current TTL 840, the number of ports 860, and the port type 870 are the same as the generation count 720, the current TTL 740, the number of ports 760, and the port type 770 of the first type of announcement packet described with respect to FIG. 7. Therefore, the detailed description thereof is omitted herein for the sake of brevity.

The network description 850 indicates a version and type of negotiated protocol associated with each port. For example, if a device has a port that supports either HDMI, MHL1/2/3 or superMHL connected to a port on a different device that supports either MHL2 or superMHL, the two devices agree to support the best common protocol, in this example superMHL. In one implementation, the network description 850 is represented in 8 bits.

The port ID 880 indicates a unique identification number of each port of the announcing device. The network ID 890 indicates a unique identification number of each connection between the announcing device and an adjacent device. In one embodiment, the network ID 890 includes (i) a lowest device ID of one of the announcing device and an adjacent device, and (ii) a port number connected to the adjacent device. In one implementation, port ID 880 of each port is represented in 8 bits, and network ID 890 of each network is presented in 64 bits.

The example payloads as illustrated in FIGS. 7 and 8 are merely illustrative. In other embodiment, the first type of announcement packet or the second type of announcement packet further includes an opcode, a destination ID, a source ID, a protocol, or a length of the packet. In another embodiment, the generation count or other information may be included in the second type of announcement packet.

Advantageously, by each device storing and broadcasting information identifying adjacent devices connected within one hop, amount of information stored in each device and bandwidth of information exchanged can be reduced. In the first phase of the network topology discovery process, each device identifies adjacent devices one hop away, and stores information identifying only the adjacent devices. In the second phase, each device broadcasts minimal information identifying the adjacent devices. Collective information from each device is enough for the requesting device to identify the complete network topology and determine an optimal data path. Therefore, amount of information stored in each device as well as amount of information exchanged between the devices can be reduced to identify the network topology.

While particular embodiments and applications of the present disclosure have been illustrated and described, it is to be understood that the embodiments are not limited to the precise construction and components disclosed herein.

What is claimed is:

1. A first device comprising:
   a plurality of ports configured to communicate with second devices and a third device, each of the second devices one hop apart from the first device, the third device connected to the first device through at least one of the second devices;
   a topology identification module coupled to the plurality of ports, the topology identification module configured to, during a discovery phase:
      receive an announcement packet generated by an announcing device among the third device and the second devices in response to receiving a request packet for requesting a transmission of the announcement packet, the request packet generated by a requesting device among the first device, the second devices and the third device, the request packet causing the first device, the second devices, and the third device other than the requesting device to generate announcement packets, each of the announcement packets comprising information identifying a device generating a corresponding announcement packet of the announcement packets, and
      determine whether the announcing device is one of the second devices or the third device based on the announcement packet generated by the announcing device; and
   a storage module configured to, during the discovery phase:
      responsive to determining that the announcing device is one of the second devices, store information identifying the announcing device, and
      responsive to determining that the announcing device is one of the third device, bypass storing of the information identifying the announcing device,
   wherein each of the first device, the second devices, and the third device is configured to identify one or more devices one hop apart from said each of the first device, the second devices, and the third device, and to store information identifying the one or more devices one hop apart from said each of the first device, the second devices, and the third device, during the discovery phase.

2. The first device of claim 1, wherein the topology identification module is further configured to, during another discovery phase:
   obtain, for each of the first device, the second devices, and the third device, the information identifying the one or more devices one hop apart from said each of the first device, the second devices, and the third device, and
   determine arrangements of the second devices and the third device and connections of the second devices and the third device based on the information identifying the one or more devices one hop apart from said each of the first device, the second devices, and the third device.

3. The first device of claim 1, wherein the topology identification module is further configured to, during the discovery phase, compare a total number of permissible hops in the announcement packet and a current number of hops in the announcement packet to determine whether the announcing device is one of the second devices or the third device, the current number of hops increased or decreased each time the announcement packet is transmitted between devices.

4. The first device of claim 1, wherein the storage module stores a global event count value indicating a number of changes in a connection status or a device capability of the first device or any device communicatively coupled to the first device, the global event count value shared with the second devices and the third device, the announcement packet including a local event count value corresponding to the global event count value at which the announcement packet is generated by the announcing device, and the topology identification module is further configured to, during the discovery phase, (i) compare the stored global event count value and the local event count value of the announcement packet, and (ii) determine whether to discard the announcement packet based on the comparison.

5. The first device of claim 4, wherein the storage module is further configured to, during the discovery phase, discard the announcement packet responsive to the event count value being less than or equal to the stored global event count value.

6. The first device of claim 1, wherein the storage module stores a global event count value indicating a number of changes in a connection status or a device capability of the first device or any device communicatively coupled to the first device, the global event count value shared with the second devices and the third device, the topology identification module is further configured to, during the discovery phase, receive an additional request packet generated by an additional requesting device among the third device and the second devices to request a transmission of an announcement packet of the first device, the additional request packet including a local event count value corresponding to the global event count value at which the additional request packet is generated by the additional requesting device, and the topology identification module is further configured to, during the discovery phase, discard the additional request packet having the local event count value equal to the stored global event count value.

7. The first device of claim 1, wherein the topology identification module is further configured to transmit the request for the transmission of the announcement packet to the second devices and the third device.

8. The first device of claim 7, wherein the topology identification module is further configured to generate a list of the second devices based at least in part on the information identifying the announcing device.

9. The first device of claim 1, wherein the requesting device is the first device, the topology identification module is further configured to, during the discovery phase, transmit the request packet of the first device responsive to (i) detecting a change of a connection status of at least one port of the topology identification module, (ii) detecting a change of a device capability of one of the third device and the second devices, or (iii) receiving an instruction to identify arrangements and connections of the first device, the second device, and the third device.

10. The first device of claim 1, wherein the first device communicates with one of the second devices through a point-to-point communication protocol complying with Mobile High-Definition Link (MHL) standard.

11. A method comprising:
receiving, at a first device during a discovery phase, announcement packets generated by second devices and a third device, each of the second devices one hop apart from the first device, the third device connected to the first device through at least one of the second devices, each announcement packet generated by a corresponding announcing device of the second devices and the third device, in response to receiving a request packet for a transmission of the announcement packets, the request packet generated by a requesting device among the first device, the second devices and the third device, each of the announcement packets comprising information identifying the corresponding announcing device;
identifying, by the first device during the discovery phase, the second devices based on the announcement packets;
storing, by the first device during the discovery phase, information identifying the second devices one hop apart from the first device; and
bypassing, by the first device during the discovery phase, storing information identifying the third device connected to the first device through the at least one of the second devices.

12. The method of claim 11, further comprising:
obtaining, during another discovery phase, for each of the first device, the second devices, and the third device, information identifying one or more devices one hop apart from said each of the first device, the second devices, and the third device, and
determining, during said another discovery phase, arrangements of the second devices and the third device and connections of the second devices and the third device based on the information identifying the one or more devices one hop apart from said each of the first device, the second devices, and the third device.

13. The method of claim 11, further comprising:
comparing, by the first device during the discovery phase, for an announcement packet of the announcement packets associated with a corresponding announcing device, a total number of permissible hops in the announcement packet and a current number of hops in the announcement packet to determine whether the corresponding announcing device is one of the second devices or the third device, the current number of hops increased or decreased each time the announcement packet is transmitted between devices.

14. The method of claim 11, further comprising:
storing a global event count value indicating a number of events representing changes in a connection status or a device capability of the first device or any device communicatively coupled to the first device, the global event count value shared with the second devices and the third device;
comparing, by the first device during the discovery phase, for an announcement packet of the announcement packets associated with a corresponding announcing device, the stored global event count value and a local event count value of the announcement packet, the announcement packet including the local event count value corresponding to the global event count value at which the announcement packet is generated by the corresponding announcing device; and determining, by the first device during the discovery phase, whether to discard the announcement packet based on the comparison.

15. The method of claim 14, further comprising:

discarding, by the first device during the discovery phase, an announcement packet of the announcement packets responsive to the event count value being less than or equal to the stored global event count value.

16. The method of claim 11, further comprising:

storing a global event count value indicating a number of events representing changes in a connection status or a device capability of the first device or any device communicatively coupled to the first device shared with the second devices and the third device;

receiving, by the first device during the discovery phase, an additional request packet generated by an additional requesting device among the third device and the second devices to request a transmission of an announcement packet of the first device, the additional request packet including a local event count value corresponding to the global event count value at which the additional request packet is generated by the additional requesting device; and discarding, by the first device during the discovery phase, the additional request packet having the local event count value equal to the stored global event count value.

17. The method of claim 11, further comprising:

transmitting, by the first device, the request for the transmission of the announcement packets to the second devices and the third device.

18. The method of claim 17, further comprising:

generating a list of the second devices based at least in part on said each of the announcement packets comprising the information identifying the corresponding announcing device.

19. The method of claim 11, further comprising:

transmitting, during the discovery phase, another request packet of the first device responsive to (i) detecting a change of a connection status of the first device, (ii) detecting a change of a device capability of one of the third device and the second devices, or (iii) receiving an instruction to identify arrangements and connections of the first device, the second device, and the third device.

20. The method of claim 11, wherein the first device communicates with one of the second devices through a point-to-point communication protocol complying with Mobile High-Definition Link (MHL) standard.

* * * * *

UNITED STATES PATENT AND TRADEMARK OFFICE
CERTIFICATE OF CORRECTION

PATENT NO. : 9,660,836 B2
APPLICATION NO. : 14/693802
DATED : May 23, 2017
INVENTOR(S) : Taliaferro Smith and Sergey Yarygin Page 1 of 1

It is certified that error appears in the above-identified patent and that said Letters Patent is hereby corrected as shown below:

In the Claims

Column 17, Line 7, replace "device, the current number of" with --device, and whether the current number of --.
Column 17, Line 63, replace "(ii) receiving" with --(iii) receiving--.
Column 17, Line(s) 64-65, replace "device, the second device" with --device, the second devices,--.
Column 18, Line 49, replace "device, the current number of" with --device, and whether the current number of--.
Column 20, Line 20, replace "device, the second device" with --device, the second devices--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*